United States Patent
Li et al.

(10) Patent No.: US 11,496,809 B2
(45) Date of Patent: Nov. 8, 2022

(54) VIDEO FILE STORAGE PREDICTION PROCESS FOR CACHES IN VIDEO SERVERS

(71) Applicant: HULU, LLC, Santa Monica, CA (US)

(72) Inventors: Xiaocheng Li, Beijing (CN); Wei Feng, Beijing (CN); Wenhao Zhang, Beijing (CN); Jiarui Yang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 16/932,512

(22) Filed: Jul. 17, 2020

(65) Prior Publication Data

US 2021/0021905 A1    Jan. 21, 2021

Related U.S. Application Data

(60) Provisional application No. 62/876,506, filed on Jul. 19, 2019.

(51) Int. Cl.
| | |
|---|---|
| *H04N 21/222* | (2011.01) |
| *H04N 21/231* | (2011.01) |
| *H04N 21/239* | (2011.01) |
| *H04N 21/658* | (2011.01) |
| *H04N 21/845* | (2011.01) |
| *H04N 21/482* | (2011.01) |
| *H04N 21/433* | (2011.01) |
| *H04N 21/466* | (2011.01) |
| *H04N 21/45* | (2011.01) |
| *H04N 21/44* | (2011.01) |

(52) U.S. Cl.
CPC ..... *H04N 21/4826* (2013.01); *H04N 21/4331* (2013.01); *H04N 21/44* (2013.01); *H04N 21/4532* (2013.01); *H04N 21/4668* (2013.01)

(58) Field of Classification Search
None
See application file for complete search history.

(56) References Cited

U.S. PATENT DOCUMENTS

| | | | |
|---|---|---|---|
| 10,277,669 B1 * | 4/2019 | Joliveau | H04L 65/4084 |
| 2008/0320222 A1 * | 12/2008 | Dhodapkar | G06F 16/9574 |
| | | | 711/E12.001 |
| 2012/0030209 A1 * | 2/2012 | Bause | H04N 21/8358 |
| | | | 707/741 |
| 2014/0095804 A1 * | 4/2014 | Lientz | G06F 11/1464 |
| | | | 711/144 |
| 2014/0207912 A1 * | 7/2014 | Thibeault | H04L 67/2847 |
| | | | 709/219 |

* cited by examiner

Primary Examiner — Hsiungfei Peng
(74) Attorney, Agent, or Firm — Kwan & Olynick LLP

(57) ABSTRACT

In some embodiments, a method receives a first set of video files at a node that delivers video files to client devices and receives a second set of video files. The second set of video files are predicted to be delivered by the node to a client device during a time period. The node receives a request for a video file from a client device and determines whether the video file is stored in the first set of video files and the second set of video files. When the video file is stored at the node, the node sends the video file from the first set of video files and the second set of video files. When the video file is not stored in the first set of video files and the second set of video files, the node sends a request for the video file to another node.

20 Claims, 11 Drawing Sheets

VIDEO FILE STORAGE PREDICTION PROCESS FOR CACHES IN VIDEO SERVERS

CROSS REFERENCE TO RELATED APPLICATIONS

Pursuant to 35 U.S.C. § 119(e), this application is entitled to and claims the benefit of the filing date of U.S. Provisional App. No. 62/876,506 filed Jul. 19, 2019, the content of which is incorporated herein by reference in its entirety for all purposes.

BACKGROUND

A video delivery system attempts to deliver video files to client devices as efficiently and as fast as possible. The video delivery system may use a content delivery network to deliver the video files. The content delivery network may use an origin server to store the video files. The origin server may be an original distribution point of the video files for the content delivery network. Instead of delivering all the videos from the origin server to client devices, the video delivery system may use edge nodes that may be located closer to certain client devices. The origin server may deliver the video files to the edge nodes, which then deliver the video files to the clients.

To deliver the videos faster to the clients, edge nodes may cache certain video files. Then, when a client device requests a video file, an edge node that is close to the client device being used by the user can deliver the video file if the video file is cached instead of delivering the video file from the origin server, which may be farther away than the edge nodes. This improves the speed and efficiency of the video delivery to the client device because the edge node may be able to deliver the video faster from the cache compared to having the origin server delivery the video file to the edge server.

Videos may be defined by "assets", which may be a program, show, episode of a show, movie, etc. Typically, a manual defined list of assets is stored on the edge nodes. This may result in the edge nodes receiving requests for these assets, but each edge node may deliver different video files for different assets over time and the manual list for the edge nodes may not be optimal.

BRIEF DESCRIPTION OF THE DRAWINGS

With respect to the discussion to follow and in particular to the drawings, it is stressed that the particulars shown represent examples for purposes of illustrative discussion, and are presented in order to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a video delivery system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some embodiments determine which video files to store on nodes that are delivering the video files to client devices. A pre-heating cache process selects the video files for a time period, such as a future time period. The selection may be at the video file level. That is, an asset may be a high level concept, such as a show, program, episode of a show, movie, etc. Each asset may have multiple video files, such as video files encoded at different bitrates. The pre-heating cache process may select which video files of an asset to store on the nodes.

A content delivery network may include an origin server and multiple edge nodes that are located closer to different sets of client devices. The pre-heating cache process may also generate lists of video files for each edge node based on a prediction of which video files may be accessed at each edge node. Videos may be defined by "assets", which may be a program, show, episode of a show, movie, etc. Each video asset may include multiple video files of different bitrates and quality levels. Each video file for a video asset may include the same content and can be delivered when a video asset is requested. However, the list of video files may be at the video file level rather than the video asset level. For example, the pre-heating cache process ranks video files that are determined to be the most popular video files on different edge nodes for a given future time period. Then, for each edge node, the origin server may store a portion of the video files, such as the highest ranked video files, in a pre-heating cache for each respective edge node.

Overview

Figure 1:
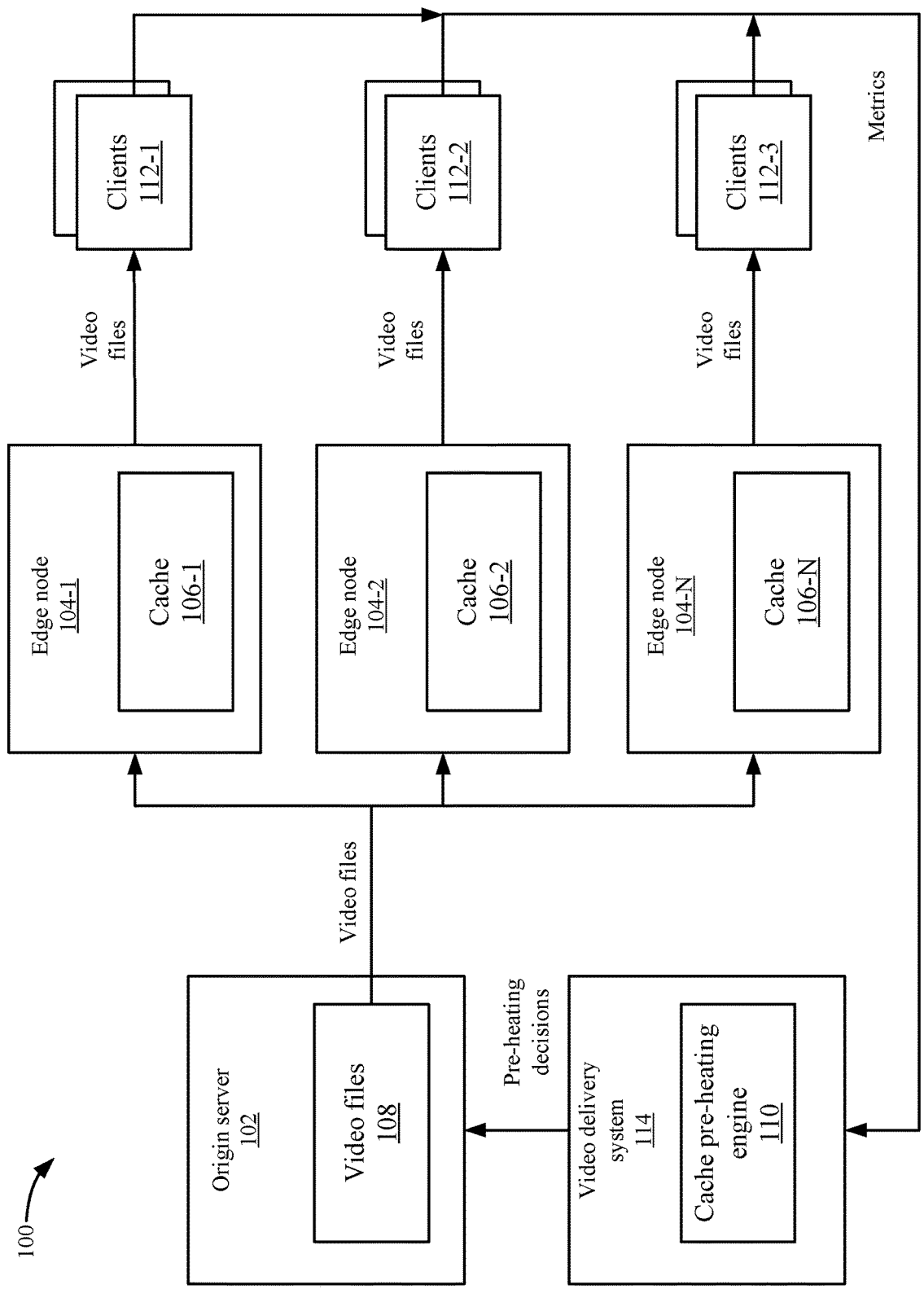
FIG. 1 depicts a simplified system for storing video files in a cache according to some embodiments.

FIG. 1 depicts a simplified system 100 for storing video files 108 on a cache 106 according to some embodiments.

System 100 includes an origin server 102, edge nodes 104, clients 112, and a video delivery system 114.

Video delivery system 114 may provide a service to allow clients 112 to play videos. For example, video delivery system 114 may offer a library of videos that are stored in video files 108. As discussed above, video delivery system 114 may categorize videos at an asset level. Each video asset may be associated with one or more video files 108. A video asset may be associated with multiple video files 108. For example, a movie or an episode of a television show may be encoded at different bitrates and/or quality levels to generate multiple video files 108. Each video file 108 would have the same content for the video asset, but with different playback characteristics (e.g., bitrates). The video asset is a higher level concept that may include all video files 108 for the video asset with the same content.

Origin server 102 may be a server that stores video files 108 for delivery to clients 112. In some examples, origin server 102 may store each video file 108 offered by video delivery system 114. However, multiple origin servers 102 may store different video files 108. Origin server 102 may be a distribution point for video files 108 in a network. For example, origin server 102 may be part of a content delivery network and is an original distribution point for the content delivery network.

Edge nodes 104-1 to 104-N (collectively "edge nodes 104") receive video files 108 from origin server 102 for delivery to clients 112. Edge nodes 104 may be servers that are situated at a different point in the network, such as at the edge of the content delivery network. Origin server 102 delivers videos through edge nodes 104 to clients 112. For example, edge nodes 104 may be geographically distributed across the network, such as edge node 104-1 may be situated on the east coast of a country, edge node 104-2 may be situated on the west coast of the country, and so on. Although each edge node 104 may be used to reach all clients 112, as will be discussed below, using some edge nodes to deliver video files 108 to certain subsets of clients 112 may be more efficient than using other edge nodes.

Clients 112 may be devices that may include media players that can play video files 108. For example, clients 112 may be smartphones, laptops, console devices, smart televisions, etc. Clients 112-1 to 112-N (collectively "clients 112") may be used by users across different geographic locations. Users may be identified by user account identifiers. The user account identifier may uniquely identify an account for the user in video delivery system 114. Other information may be associated with the user account identifier, such as a location, a client type, etc. The user account identifier may identifier a user account, which may be associated with one or more users. Also, the user account identifier may be for a user profile. In this case, a user account may have multiple user profiles.

Over a time period, a first set of clients 112-1 may access video files 108 using edge node 104-1, a second set of clients 112-2 may access video files 108 using edge node 104-2, and a third set of clients 112-N may access edge node 104-N. It is noted that the sets of clients are not mutually exclusive in that the same client may access video files 108 from multiple edge devices 104. Also, each edge node 104 may deliver different videos files 108 to clients 112 depending on which video files 108 are requested during that time period and from which clients 112. In some examples, a first client in set of clients 112-1 may request a first video file 108 and be located on the east coast of the country, and a second client in set of clients 112-2 may request a second video file 108 and be located on the west coast of the country. If edge node 104-1, which is on the east coast of the country, is used to deliver a first video file 108 to the first client instead of edge node 104-2, which is on the west coast of the country, the video delivery may be more efficient and faster. This is because the distance from edge node 104-1 to the first client is closer due to both being located on the east coast compared to a distance between edge node 104-2 to the first client, coming from the west coast. Accordingly, the video delivery may be more efficient if the first video file 108 is cached on edge node 104-1 before the first client requests the first video file 108. The second client may request a second video file 108 and it is more efficient if a second video file 108 is cached on edge node 104-2 on the west coast of the country because this edge node is closer to the second client. As discussed above, it is possible that different edge nodes 104 may be delivering different video files 108. Accordingly, video files 108 may be cached in different edge nodes, such as in cache 106-1 of edge node 104-1 or cache 106-2 of edge node 104-2, etc. to improve video delivery.

Video delivery system 114 may predict which video files 108 should be stored in caches 106 of specific edge nodes 104 in a time period. According to the pre-heating decisions, origin server 102 stores video files 108 on edge nodes 104 before being requested by clients 112 in the time period that was used in the prediction. These cache pre-heating decisions determine which video files 108, such as the top N highest ranked video files 108 that are predicted to be accessed on specific edge nodes 104. Then, origin server 102 may send video files 108 to edge nodes 104 for storage on respective caches 106. In some embodiments, video files 108 may be stored at the video file level. That is, an asset may be associated with multiple video files 108. Video delivery system 114 selects which video files 108 to store on edge nodes 104. For one asset, it is possible that a video file 108 at a first bitrate is stored on an edge node 104, but a second video file at a second bitrate with the same content is not stored on the same edge node 104. In this case, video delivery system 114 predicts that it is more likely the video file 108 at the first bitrate may be accessed.

In some embodiments, cache pre-heating engine 110 uses metrics to select video files 108, such as metrics associated with user behavior on video delivery system 114. For example, the metrics may be click metrics, such as historical click metrics, that are associated with user account actions on video delivery system 114. The click metrics measure selections received from user account (e.g., users) while using the system. For example, the metrics include a click-through rate (CTR) or click-view rate (CVR). A click-through rate measures when a selection is received to view a video on video delivery system 114. The selection is associated with a user account identifier (for a user to watch the video) Also, a click-view rate measures how long a video is watched on video delivery system 114. Because video delivery system 114 includes a service in which user account identifiers of clients 112 subscribe, video delivery system 114 receives the click metrics. This is different from a company that operates a content delivery network (CDN) on behalf of other companies. The CDN operator may not be able to receive the click metrics because the CDN is just delivering the video to clients without receiving metrics from the user account actions from specific user account identifiers. That is, the CDN operator just knows that the video was requested, but not by which user account identifier.

Video delivery system 114 may then be able to associate metrics with certain edge nodes 104. For example, video delivery system 114 can associate a client's location with an edge node's location. Video delivery system 114 may determine the client's location using different methods, such as by using geolocation, an address submitted in a user profile that is using the client 112, or other methods. The metrics may also identify an edge node 104 that was used to deliver video file 108. The content delivery network may record which edge node 104 is selected to deliver video file 108 to client 112.

Cache pre-heating engine 110 may predict which video files 108 may be accessed over a future time period. The prediction may be more accurate than a manual list of assets that is used for all edge nodes 104. For example, cache pre-heating engine 110 generates a prediction per edge node and at the video file level. In some examples, cache pre-heating engine 110 may first predict which clients 112 may be accessing video delivery system 114 in the future time period. Then, cache pre-heating engine 110 predicts which edge nodes 104 those clients 112 may use. This allows cache pre-heating engine 110 to predict which video files 108 that clients 112 may access and then associate the video files 108 to specific edge nodes 104. Cache pre-heating engine 110 can then rank video files 108 that may be accessed on each edge node 104. Based on the ranking, origin server 102 can deliver video files 108 to edge nodes 104 for storage in respective caches 106. The following will describe the process in more detail.

Cache

Figure 2:
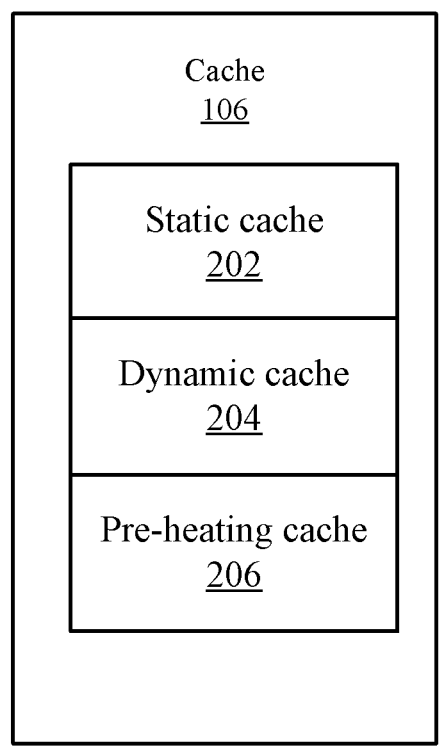
FIG. 2 depicts a more detailed example of the cache according to some embodiments.

FIG. 2 depicts a more detailed example of cache 106 according to some embodiments. Cache 106 may be storage and may include different layers of storage or memory. For example, cache 106 includes a static cache 202, a dynamic cache 204, and a pre-heating cache 206. Static cache 202 may store video files 108 that are statically stored on cache 106. In some examples, video files 108 in static cache 202 are manually determined and are the same across all edge nodes 104. In some embodiments, these video files 108 may be removed based on different requirements, such as business requirements or contract requirements. The removal may not be based on playback of video files 108 via an edge node 104.

Dynamic cache 204 may dynamically store video files 108 based on video files 108 that are requested by clients 112. For example, video delivery system 114 may decide to store a video file 108 in dynamic cache 204 after the video file is requested and sent to a client 112. Video delivery system 114 may use different algorithms to analyze video files 108 that are requested by clients 112 through an edge node 104 and store some of these video files 108 in dynamic cache 204. Edge nodes 104 may have different files stored in dynamic cache 204 depending on which files were requested during a time period. Accordingly, dynamic cache 204 may only store video files 108 that were requested by a client 112.

Pre-heating cache 206 may store videos based on a prediction process by video delivery system 114. For example, cache pre-heating engine 110 predicts which video files 108 to store in pre-heating cache 206 where these video files 108 are predicted to be more likely to be accessed by clients 112 via that edge node 104 in a future time period. In some embodiments, pre-heating cache 206 may store video files 108 that are new to video delivery system 114. That is, the new video files 108 that have not been offered for playback before being stored in pre-heating cache 206. However, other video files 108 that may be predicted for pre-heating may also be stored in pre-heating cache 206.

If duplicate video files 108 end up in static cache 202, dynamic cache 204, and/or pre-heating cache 206, then a process may remove the duplicated video files. The removal process may detect multiple copies of the same video file 108 in multiple caches. Upon detection, the process may remove all but one copy. The process may determine which cache to keep the remaining video file 108 within based on different logic. For example, a very popular video may be kept in static cache 202 so that the video file is not removed for a longer time period. In other embodiments, edge node 104 may not store a video file 108 in cache 106 if it is already stored in another cache.

Prediction Process

Cache pre-heating engine 110 may determine which video files 108 to store in pre-heating cache 206 based on a predicted access of video files 108 in a future time period, such as the next 24 hours. To generate an accurate prediction, cache pre-heating engine 110 may generate a list of video files 108 for each edge node 104. Because different clients 112 may access different edge nodes 104, and the different clients 112 may request different video files 108, cache pre-heating engine 110 generates specific lists of video files 108 for respective edge nodes 104. Also, cache pre-heating engine 110 may generate the prediction at the video file level, and not the video asset level, but predictions at the video asset level may also be performed. When the video asset level is used, all video files 108 for the video asset may be stored at an edge node 104. Using the video file level may be advantageous when edge nodes play back different types of video files 108 for a video asset. For example, an area where an edge node 104 is located that has lower bandwidth network resources may only need lower bitrate video files 108 while an edge node 104 in a high bandwidth area may require higher bitrate video files 108. Performing the prediction at the video file level makes the efficiency of pre-heating cache 206 better as more cache hits may occur where requests for video assets result in video files 108 for that video asset being stored in pre-heating cache 206.

Figure 3:
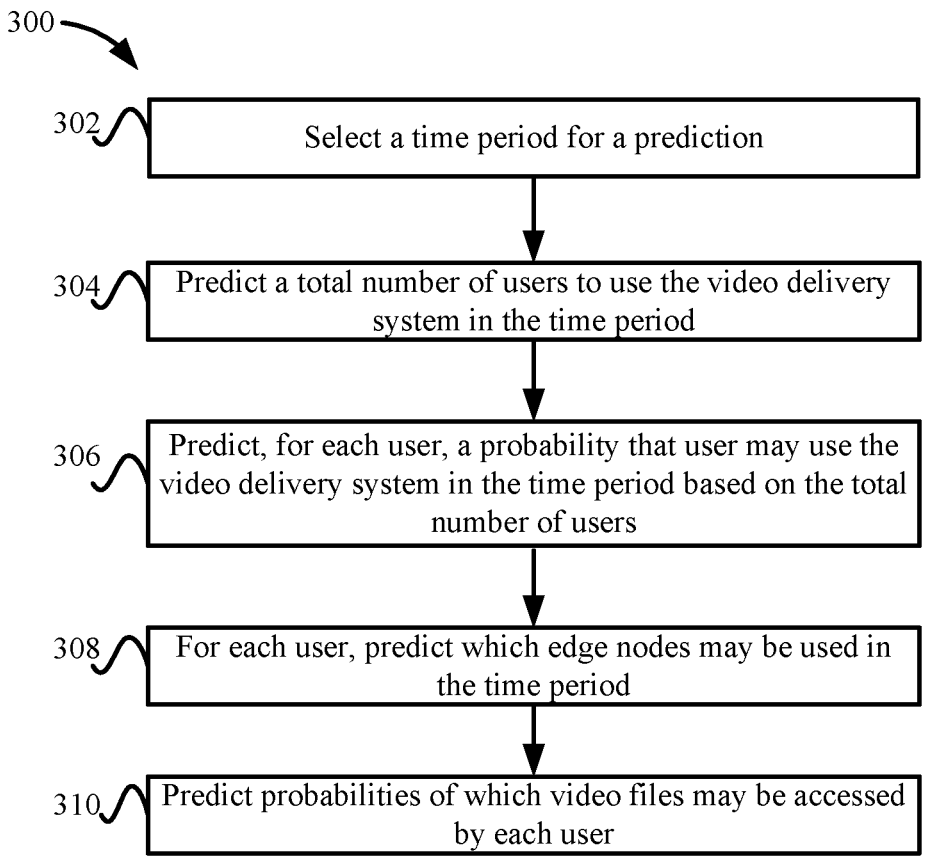
FIG. 3 depicts a simplified flowchart of a method for predicting video files to store on edge nodes according to some embodiments.

FIG. 3 depicts a simplified flowchart 300 of a method for predicting video files 108 to store on edge nodes 104 according to some embodiments. At 302, cache pre-heating engine 110 selects a time period for a prediction. The time period may be a future time period, such as hours, days, weeks, months, etc., in the future.

At 304, cache pre-heating engine 110 predicts a total number of user account identifiers that may use the video delivery system 114 in the time period. When the term "user account identifier" is described, the term may mean an identity on video delivery system 114, such as a user profile, user account identifier, etc. The user account identifier may be associated with a single user or multiple users (e.g., a family). The total number of user account identifiers does not identify the specific user account identifiers. That is, the total number of user account identifiers may be 1 million user account identifiers, whereas a specific user account identifier may be user #100000. The term user account identifiers may also include clients 112. That is, a total number of clients 112 is predicted that may use video delivery system 114.

In some embodiments, cache pre-heating engine 110 may use a process to predict an overall traffic number for the next period for video delivery system 114. The overall traffic number may be how many user account identifiers may access video delivery system 114. For example, video delivery system 114 may have statistics on the overall traffic of which user account identifiers accessed video delivery system 114 for each day over a previous time period, such as the last several years. Cache pre-heating engine 110 includes a prediction network that uses the statistics to predict the usage over the next period of how many user account identifiers may use video delivery system 114. In some embodiments, a regression model is used to predict the number of user account identifiers that may use video delivery system 114. In some examples, a regression model may be used that receives the past 12 months of user account identifiers, such as daily active user account identifiers, weekly active user account identifiers, etc., and models the relationship to predict a total number of user account identifiers. The total number may be a daily active number of user account identifiers, weekly active number of user account identifiers, etc. for the next time period. The output may be an N number of user account identifiers that are predicted to use video delivery system 114 during the next time period.

Next, at 306, after determining the total number active user account identifiers for video delivery system 114, cache pre-heating engine 110 predicts a probability that each user account identifier may use video delivery system 114. The total number of user account identifiers is a general number of user account identifiers (e.g., one million user account identifiers). Assuming the total number of user account identifiers is less than all possible user account identifiers of video delivery system 114, cache pre-heating engine 110 then predicts which user account identifiers are most likely to use video delivery system 114 during the designated time period. That is, instead of a total number of user account identifiers of video delivery system 114 in a future time period, cache pre-heating engine 110 predicts whether user account identifiers of user ID #1, #2, . . . , #N, may use video delivery system 114.

The prediction network may output prediction probabilities of probability P1, P2, . . . , PN (the "prediction"). Each probability may be associated with a user account identifier #1, #2, . . . , #N. Cache pre-heating engine 110 may use the following to determine the probabilities:

Define $PPi=Pi/(P1+P2+ \ldots +Pn)$; and $N'=P1+P2+ \ldots +Pn,$ where a value PPi is the percentage of total impressions in video delivery system 114 for a user account identifier, Pi is the predicted impression number for a user account identifier in the next period, and N' is the total number of impressions for video delivery system 114. An impression may be a number of times the user account identifier may use video delivery system 114 to view a video file 108. The value of N' is generated by using the total active user account identifiers to determine a total number of impressions for video delivery system 114 when the predicted active user account identifiers use video delivery system 114 in the time period. An impression indicates a playback/download from a certain client 112, which is equivalent to an access to the CDN from a certain user account identifier.

Then, at 308, cache pre-heating engine 110 uses a prediction model to predict, for each user account identifier that may access video delivery system 114, which edge node 104 that user account identifier may use. For example, the input to the prediction network may include geolocation information for user account identifiers, registration address for user account identifiers, accessing IP address and edge nodes' geolocation information, addresses of edge nodes, etc. In addition, the user account identifiers' playback history together the identifiers' network downloading trace history (e.g., which nodes used) may be used. The above input may be used to identify the edge nodes 104 accessed by the user account identifier previously over a time period, and the prediction network outputs the predicted probability of that user account identifier accessing all of the possible edge nodes 104. For a certain user account identifier, the edge node identifiers ID #1, #2, . . . , #N predicts the probabilities of Q1, Q2, . . . , Qn. For example, cache pre-heating engine 110 may determine the probabilities for each edge node as:

Define $PQi=Qi/(Q1+Q2+ \ldots +Qn),$ where PQi is the probability for accessing an edge node out of all the edge nodes for a user account identifier i and Qi is the probability for an edge node i. "Q1+Q2+ . . . +Qn" is the total probably for all edge nodes.

Figure 4:
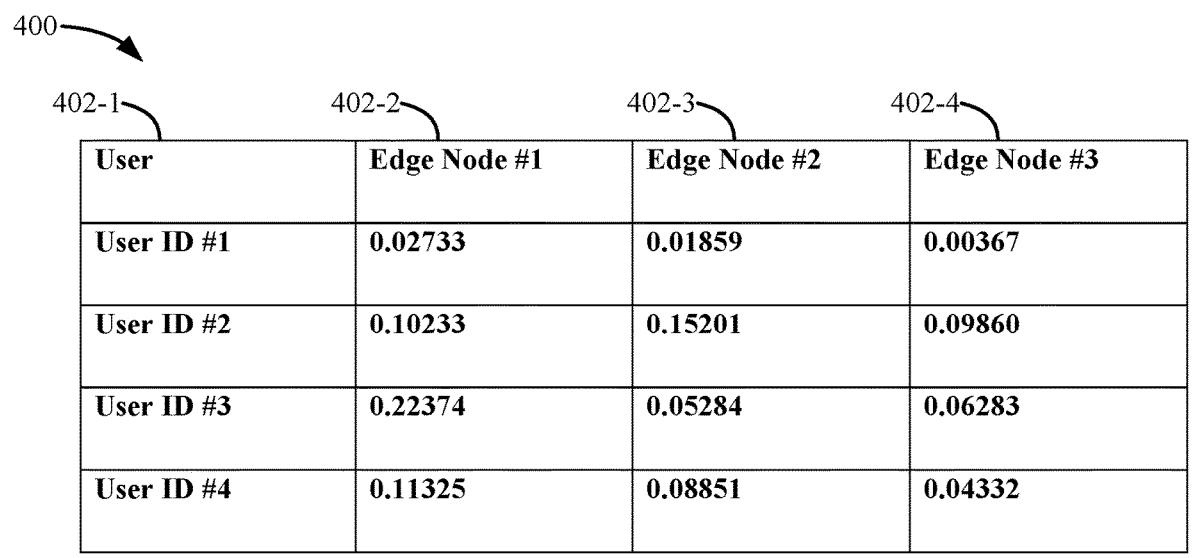
FIG. 4 depicts a table of probabilities, for each user, of accessing each edge node according to some embodiments.

FIG. 4 depicts a table 400 of probabilities, for each user account identifier, of accessing each edge node 104 according to some embodiments. A first column 402 includes a list of user account identifiers, such as user account identifiers #1 to #4, but table 400 may include all user account identifiers of video delivery service 114 that are predicted to use the service in the time period. Columns 402-2 to 402-4 list three edge nodes 104, but table 400 may list all possible edge nodes 104 that can be used.

For each user account identifier, table 400 lists a probability of accessing a specific edge node 104. For example, a user account identifier #1 has the values for edge node #1, edge node #2, and edge node #3 of 0.02733, 0.01859, and 0.00367, respectively. Also, a user account identifier #2 has the values for edge node #1, edge node #2, and edge node #3 of 0.10233, 0.15201, and 0.09860, respectively. In some embodiments, the lower the number, the lower predicted probability that that user account identifier may access that edge node 104 in the time period. Thus, it is more likely that user account identifier #2 may access edge nodes #1, #2, and #3 compared to user account identifier #1. For example, for edge node #1, the probability 0.10233 for user account identifier #2 is greater than the probability of 0.02733 for user account identifier #1.

At 310, cache pre-heating engine 110 generates a prediction of which video files 108 each user account identifier may access. In some embodiments, cache pre-heating engine 110 generates the prediction for each video file 108 offered by video delivery system 114. Or, the prediction is for a portion of the video files 108, such as only candidate video files 108 that may be eligible for caching in pre-heating cache 106. For example, unpopular videos may not be considered. The prediction may be a probability the user account identifier may access video file 108, but other predictions may also be used. Also, in some embodiments, cache pre-heating engine 110 generates the prediction using metrics from using video delivery system 114, such as previous video files 108 that were accessed by each user account identifier. In some embodiments, cache pre-heating engine 110 uses click metrics, such as a click through rate and a click view rate, for each user account identifier. The prediction may be similar to determining recommendations of which asset to recommend for a user account identifier; however, the prediction is based on predicting a video file 108 that may be accessed by a user account identifier, not the recommendation of an asset. For example, an episode of a show may be associated with multiple video files 108. Instead of recommending the episode itself, cache pre-heating engine 110 predicts the probability of accessing each video file 108 for that episode. That is, cache pre-heating engine 110 may determine the prediction at the video file level. This is the video file 108 that is predicted to be actually accessed by the user account identifier. For example, an episode or a show may have multiple versions in multiple video files 108, such as a first video file in a first bitrate, a second video file in a second bitrate, etc. Cache pre-heating engine 110 predicts the probabilities of accessing the first video file 108 at the first bitrate and the second video file 108 at the second bitrate.

In some embodiments, the input to the prediction network includes user information (e.g., geographical information, address information, IP address, age, male/female, etc.), user account playback history (e.g., the preference type of a video, preferred viewing devices, etc.), video metadata and tag information (e.g., video category, actor/actress, key words, etc.), a video file's historical click metrics (e.g., a video file's access/playback/download history), and other information that may be relevant. Depending on if video files 108 are associated with a new video file 108 (e.g., the video file 108 for the video asset has not been played or has been played an amount of times below a threshold) or a video file 108 that has been played, the prediction network may separate the detailed usage. For example, if video file 108 has been played (e.g., above a threshold) and has associated click metrics, then the prediction network uses existing click metrics in the prediction. If video file 108 is a new video asset in which historical click metrics is below a threshold, then the prediction network may link this new video file 108 to one or more existing video files 108 via the video metadata/tags/keywords. Then, the prediction network may use the click metrics of the similar video files 108 to predict a probability of a user accessing a video file 108. Also, video files 108 may be explicitly assigned to user accounts. For example, a rule may specify click metrics for a video file 108 is equal to "1" (e.g., the value of "1" being a highest value) to a user account with certain demographics.

Figure 5:
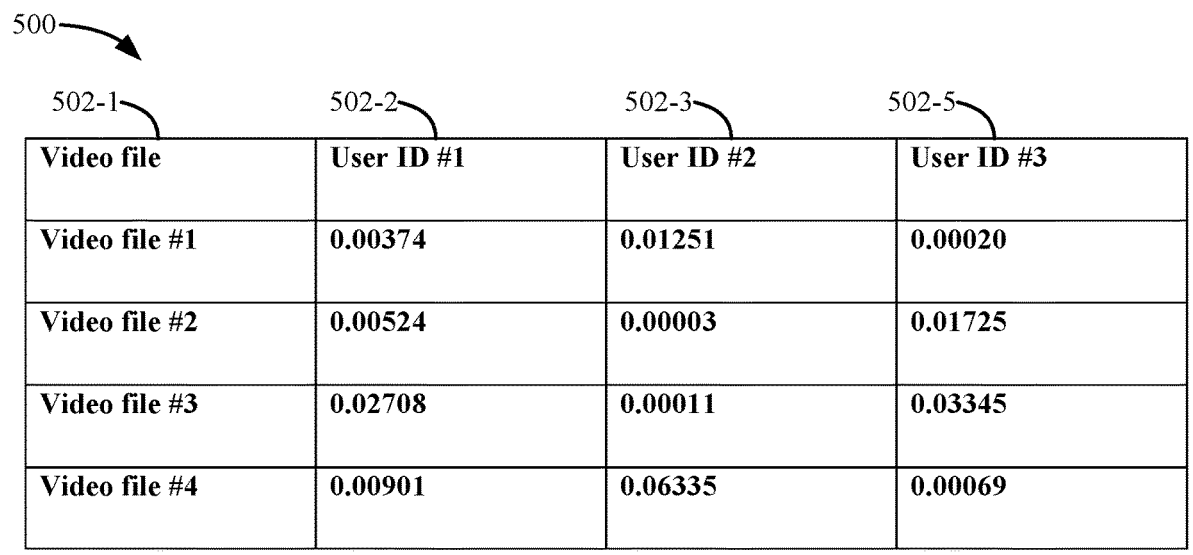
FIG. 5 depicts a table of video files and associated predicted probabilities for accessing those video files for users according to some embodiments.

FIG. 5 depicts a table 500 of video files 108 and associated predicted probabilities for accessing those video files 108 for user account identifiers according to some embodiments. For example, cache pre-heating engine 110 predicts that a video file #1 may be accessed by a user account identifier #1, a user account identifier #2, and a user account identifier #3, with the predicted probabilities of 0.00347, 0.01251, and 0.00020, respectively. Also, cache pre-heating engine 110 predicts that video file #2 may be accessed by a user account identifier #1, a user account identifier #2, a user account identifier #3, with the predicted probabilities of 0.00524, 0.00003, and 0.01725, respectively. In some embodiments, the lower the predicted probability, the lower the probability that that user account identifier may access that video file 108. Thus, user account identifier #2 may be most likely to access video file #1 because the probability 0.02708 is higher than the other probabilities for other video files 108 and user account identifier #3 is most likely to access video file #3 because the probability 0.03345 is higher than the other probabilities for other video files 108.

Edge Node Prediction

Figure 6:
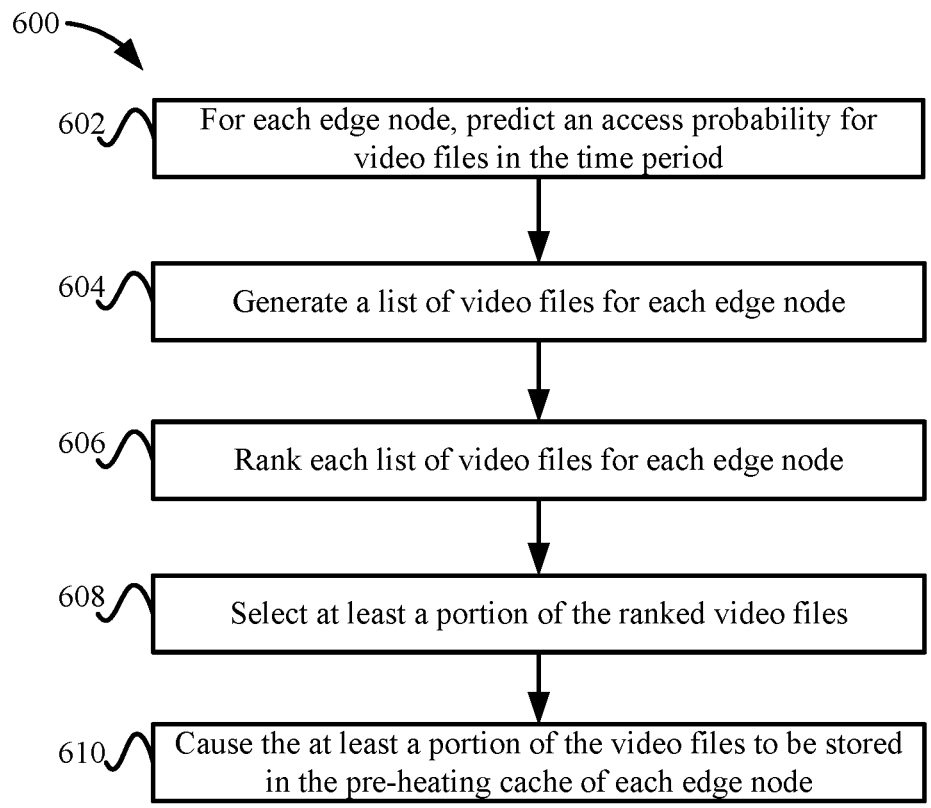
FIG. 6 depicts a simplified flowchart of a method for ranking video files for edge nodes according to some embodiments.

Once cache pre-heating engine 110 determines per user account identifier predictions, cache pre-heating engine 110 can use those predictions to determine the access probability for each video file 108 against each edge node 104. FIG. 6 depicts a simplified flowchart 600 of a method for ranking video files 108 for edge nodes 104 according to some embodiments. The following process may be performed for each edge node 104, or a subset of edge nodes 104 that are targeted for pre-heating of caches 106.

At 602, cache pre-heating engine 110 predicts an access probability for video files 108 in the time period. For example, cache pre-heating engine 110 determines the access probability for each video file 108 against each edge node 104. Cache pre-heating engine 110 uses the probabilities of user account identifiers accessing a respective edge node 104 and the probabilities of the user account identifiers accessing video files 108 on those edge nodes 104. For example, cache pre-heating engine 110 may use the calculation:

$$F[k,j] \text{ is equal to } \text{Sum}(A(i)*E(i,j)*CTR(i,k)),$$

where F is the file i access probability against an edge node j, k is the video file, j is the edge node number, i is a user account identifier, Sum is a sum operation, A is a probability for accessing video delivery system 114 for a user account identifier i, E is the probability for accessing an edge node 104 out of all the edge nodes, CTR is a click through rate (but other click metrics may be used) for a user account identifier i on a video file k. The function F[k,j] calculates, for a video file k, a summary of probable user account identifiers that may access the video file k. The value of the function F[k,j] can exceed 1.0 in some cases, especially when a video file 108 is very popular. The above prediction generates a list of video files 108 for each edge node 104 with predicted probabilities for each video file 108. The function A(i) is a user account's impression, which is if the user account will playback a video file 108 during a time period. The function E(i,j) is the association between a user account and an edge node 104 and the function CTR(i,k) is the association between a user account and a video file. The function E(i,j) may be similar to, but not limited to, the function PQi, which is the probability for accessing an edge node 104 out of all the edge nodes. However, the function E(i,j) represents the probability of a user account identifier accessing a video file 108 on an edge node 104. The function A[i] may be similar to, but not limited to, the variable PPi, which is the percentage of total impressions in video delivery system 114 for a user account identifier. However, the function A[i] is the percentage of total impressions by a user account identifier per edge node 104 for a video file 108. The higher value for the function F[k,j], a video k is predicted to be more popular on edge node j. Also, cache pre-heating engine 110 can reset the function A[i]=PPi*(N/N') for more precision, which can help to have a more accurate absolute number although a relevance number can also be used. The variable N is the total number of users and the value of N' is generated by using the total active user account identifiers to determine a total number of impressions for video delivery system 114 when the predicted active user account identifiers use video delivery system 114 in the time period. Accordingly, the function A[i] may equal PPi or PPi*(N/N'). When the number of users is large and their impression probability is sparse, the value of the variable PPi may be very small during the calculation. The result's accuracy may be lost. To compensate, the variable PPi is multiplied by a factor equal to (N/N') to enlarge the number value of A[i]. For user account identifier i, the probability of that user account identifier's access against specific edge node j is the value of PQj. Cache pre-heating engine 110 uses the value of E(i,j) over a time period. Also, the user account identifier access probability in the next period is A[i]=PPi*(N/N'). The term N/N' is used to have more accurate absolute number although a relevance number also works.

For each edge node, at 604, cache pre-heating engine 110 generates a list of video files that are predicted to be accessed during the time period. Each edge node 104 may have a different list of video files 108. However, some edge nodes 104 may have the same list, and some video files 108 may be included for multiple edge nodes 104.

At 606, cache pre-heating engine 110 ranks the predicted probabilities for each video file 108. Then, at 608, cache pre-heating engine 110 selects at least a portion of the ranked video files 108. The portion may be less than the total of video files 108 that are ranked, and may be the top N video files 108. Methods other than the top N video files 108 may be used, such as adjusting the probabilities by file size or multiplying the probabilities by file size to select the top N files. At 610, cache pre-heating engine 110 causes the at least a portion of the video files to be stored in the pre-heating cache 106 of each edge node 104.

In some embodiments, other methods may also be used to perform the ranking. For example, cache pre-heating engine 110 may use the following:

$$F[i,k,j]=A(i)*E(i,j)*CTR(i,k)$$

$$F[k,j]=(1-F[1,k,j])*(1-F[2,k,j])* \ldots (1-F[n,k,j])$$

Rank F[k,j] in a reverse order (e.g., smaller on the top).

This method calculates a probability that no user account identifiers may access the video file. Then, cache pre-heating engine 110 performs a reverse ranking of video files 108 to select the video files with the lowest probability of no users may access the video file 108. This is different from the above method that summarized the total access probabilities for different video files 108 against edge nodes and ranks them in order.

Figure 7:
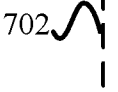
FIG. 7 depicts an example of a ranked list of video files for an edge node according to some embodiments.

FIG. 7 depicts an example of a ranked list of video files 108 for an edge node 104 according to some embodiments. Cache pre-heating engine 110 has ranked video files 108 by access probability across all user account identifiers that may access video files 108 through this edge node 104. The ranking in this case is by sorting access probability values from high to low, but other methods of ranking may be used as discussed above. At 702, cache pre-heating engine 110 selects the top N video files 108 for this edge node 104.

Edge Node

Figure 8:
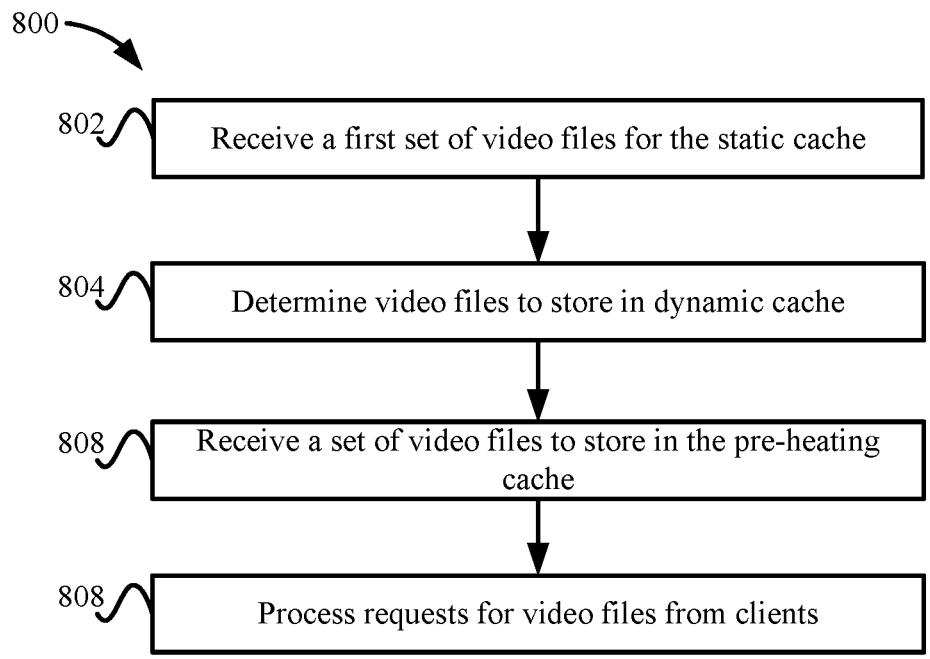
FIG. 8 depicts a video streaming system in communication with multiple client devices via one or more communication networks according to one embodiment.

Using pre-heating cache 106, edge node 104 may deliver video files 108 more efficiently and faster. FIG. 8 depicts a simplified flowchart 800 for storing video files 108 on edge node 104 according some embodiments. At 802, edge node 104 receives a set list of video files 108 for static cache 202. The first list may be manually configured and is the same on all edge nodes 104. At 804, edge node 104 determines video files 108 to store in dynamic cache 204. Video files 108 may be stored in dynamic cache 204 upon being sent to clients 112 through edge node 104. Video files 108 in dynamic cache 204 may be different across edge nodes 104 depending on which video files 108 are sent to clients 112 through a respective edge node 104.

At 806, edge node 104 receives a set of video files 108 to store in pre-heating cache 206. Each edge node 106 may receive a different set of video files 108 for its respective pre-heating cache 206. In some embodiments, edge node 104 stores video files 108 in pre-heating cache 206 for a determined period of time, such as the period of time that was used in the prediction. Thereafter, edge node 104 may receive changes to video files 108 that are stored in pre-heating cache 206. At 808, edge node 104 processes requests for video files 108 from clients 112. It is noted that video files 108 that are stored in cache 106 may be dynamically changed while edge node 104 processes requests from clients 112.

Figure 9:
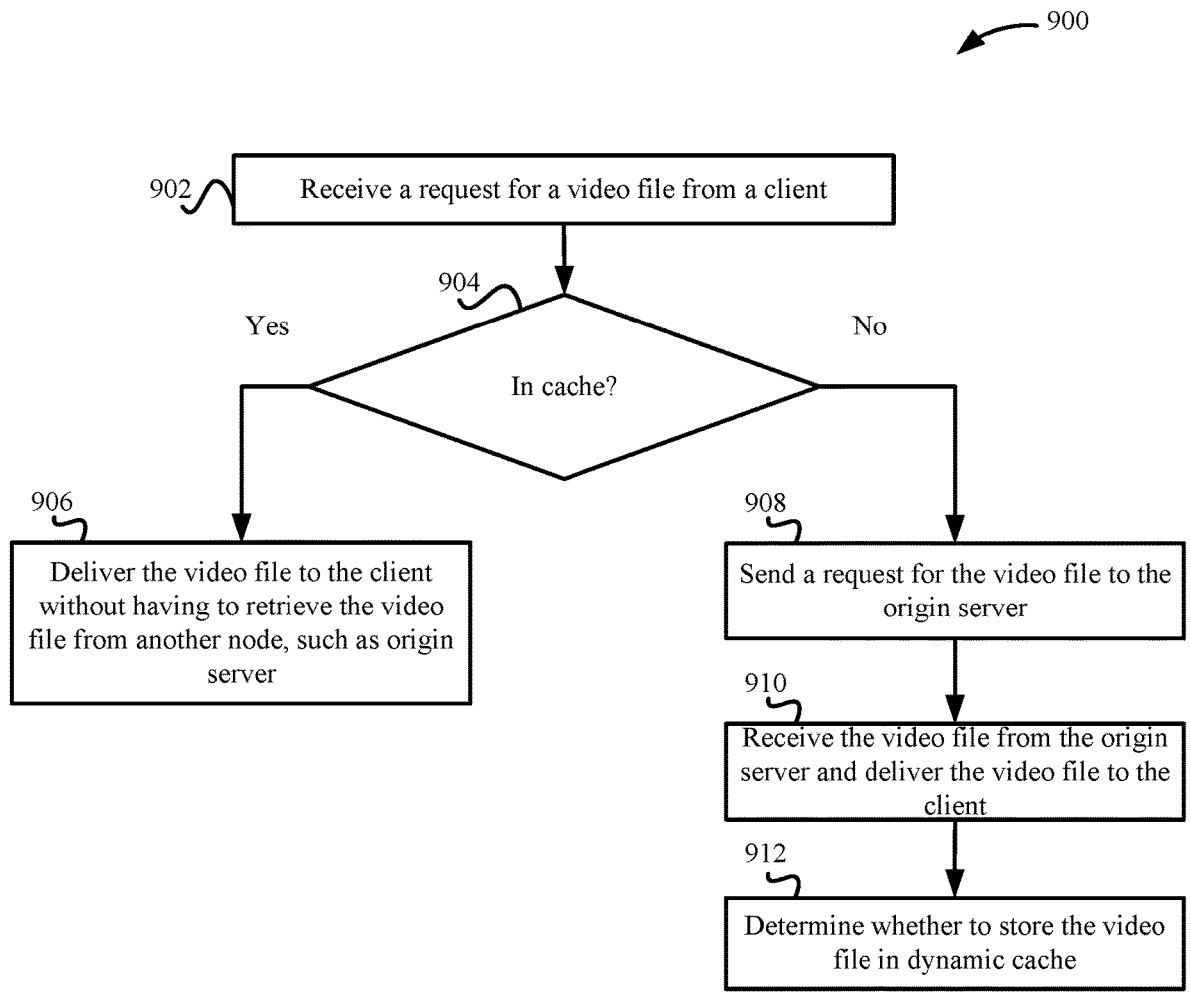
FIG. 9 depicts a diagrammatic view of an apparatus for viewing video content and advertisements.

FIG. 9 depicts a simplified flowchart 900 of a method for processing requests for video files 108 according to some embodiments. At 902, edge node 104 receives a request for a video file 108 from a client 112. The request may be for a specific video file 108 of a video asset. For example, client 112 may select a video asset and be presented with a list of video files 108 for that video asset. Then, client 112 selects a video file 108 for that video asset from the list. Client 112 may make the selection based on different factors, such as available bandwidth. At 904, edge node 104 determines whether video file 108 is stored in cache 106. If video file 108 is stored in cache 106, at 906, edge node 104 delivers video file 108 to client 112 without having to retrieve video file 108 from another node, such as origin server 102.

If video file 108 is not stored in cache 106, at 908, edge node 104 sends a request for video file 108 to origin server 102. At 910, edge node 104 receives video file 108 from origin server 102 and delivers video file 108 to client 112. At 912, edge node 106 determines whether to store video file 108 in dynamic cache 204.

Conclusion

Accordingly, cache pre-heating engine 110 predicts per edge node 104, which video files 108 may be accessed in a time period. Some embodiments add another layer of cache storage to store the predicted video files 108 in edge nodes 104. The prediction is at the video file layer, which stores video files 108 that may be more likely to be accessed, instead of all video files for an asset. In this case, if a video file for an asset is accessed with a high bitrate on an edge node 104 most of the time, then a video file for an asset with a low bitrate does not need to be stored on the edge node.

Embodiments

In some embodiments, a method comprising: receiving a first set of video files at a node that delivers video files to client devices; receiving a second set of video file at the node, wherein the second set of video files are predicted to be delivered by the node to a client device during a time period; receiving, by the node, a request for a video file from a client device; determining, by the node, whether the video file is stored in the first set of video files and the second set of video files; when the video file is stored in the first set of video files and the second set of video files, sending, by the node, the video file from the first set of video files and the second set of video files; and when the video file is not stored in the first set of video files and the second set of video files, sending, by the node, a request for the video file to another node.

In some embodiments, the first set of video files is set on multiple nodes that deliver video files to client devices.

In some embodiments, the first set of video files are manually set.

In some embodiments, further comprising: storing a third set of video files based on the video files in the third set being sent to client devices, wherein the third set of video files were requested from another node.

In some embodiments, the second set of video files are updated upon expiration of the time period, and the updated second set of video files are predicted to be delivered by the node to a client device during a next time period.

In some embodiments, the second set of video files are determined by predicting which client devices may access the second set of video files on the node during the time period.

In some embodiments, a plurality of nodes delivery the video files to the client devices, the first set of video files are the same across the plurality of nodes, and the second set of video files are determined per node in the plurality of nodes based on predicting which client devices may access a respective second set of video files on a respective node during the time period.

In some embodiments, a non-transitory computer-readable storage medium having stored thereon computer executable instructions, which when executed by a computing device, cause the computing device to be operable for: receiving a first set of video files at a node that delivers video files to client devices, wherein the first set of videos; receiving a second set of video file at the node, wherein the second set of video files are predicted to be delivered by the node to a client device during a time period; receiving, by the node, a request for a video file from a client device; determining, by the node, whether the video file is stored in the first set of video files and the second set of video files; when the video file is stored in the first set of video files and the second set of video files, sending, by the node, the video file from the first set of video files and the second set of video files; and when the video file is not stored in the first set of video files and the second set of video files, sending, by the node, a request for the video file to another node.

In some embodiments, a method comprising: predicting, by a computing device, a plurality of user accounts that may use a video delivery system to deliver video files through a plurality of nodes in a period of time; predicting, by the computing device, probabilities of which nodes may be used for each of the plurality of user accounts in the time period; predicting, by the computing device, probabilities of which video files may be accessed by each of the plurality of user accounts; generating, by the computing device, a list of video files for each node based on the probabilities of which video files may be accessed and the probabilities of which nodes may be used for each of the plurality of user accounts; and causing, by the computing device, at least a portion of the list of video files to be stored on a node associated with the list, wherein a video file in the list is not stored on the node.

In some embodiments, further comprising: predicting a total number of user accounts to use the video delivery system in the time period, wherein the total number of user accounts is used to predict the plurality of users accounts that may use the video delivery system.

In some embodiments, predicting the plurality of user accounts that may use the video delivery system comprises: predicting a probability for the plurality of user accounts that each respective user may use the video delivery system based on the total number of user accounts to use the video delivery system in the time period.

In some embodiments, predicting the probabilities of which nodes may be used for each of the plurality of user accounts comprises: predicting an impression value that indicates a likelihood of a video file being accessed by each of the plurality of user accounts.

In some embodiments, predicting the probabilities of which nodes may be used for each of the plurality of user accounts comprises: generating probabilities of accessing each edge node for each of the plurality of users.

In some embodiments, predicting probabilities of which video files may be accessed by each of the plurality of user accounts comprises: using metrics from which video files were viewed by a user account to predict the probabilities of which video files may be accessed by the user account.

In some embodiments, generating the list of video files for each node comprises: using an access probability of the plurality of users that may access an edge node and an access probability to access a video file on the edge node to generate a list of video files for the edge node.

In some embodiments, further comprising: ranking the list of video files for an edge node; and selecting the at least a portion of the list of video files from the ranked list of video files.

In some embodiments, causing the at least a portion of the list of video files to be stored on the node comprises: sending a signal to store the at least the portion of the video files on the node.

In some embodiments, the at least the portion of the list of video files is stored in a first portion of memory in the node, the first portion of memory being valid for the time period.

In some embodiments, the node comprises a second portion of memory to store video files that are dynamically stored after the user account views the video files.

In some embodiments, the node comprises a third portion of memory to store video files that are statically stored on the node, wherein the videos in the third portion do not change during the time period.

System

Figure 10:
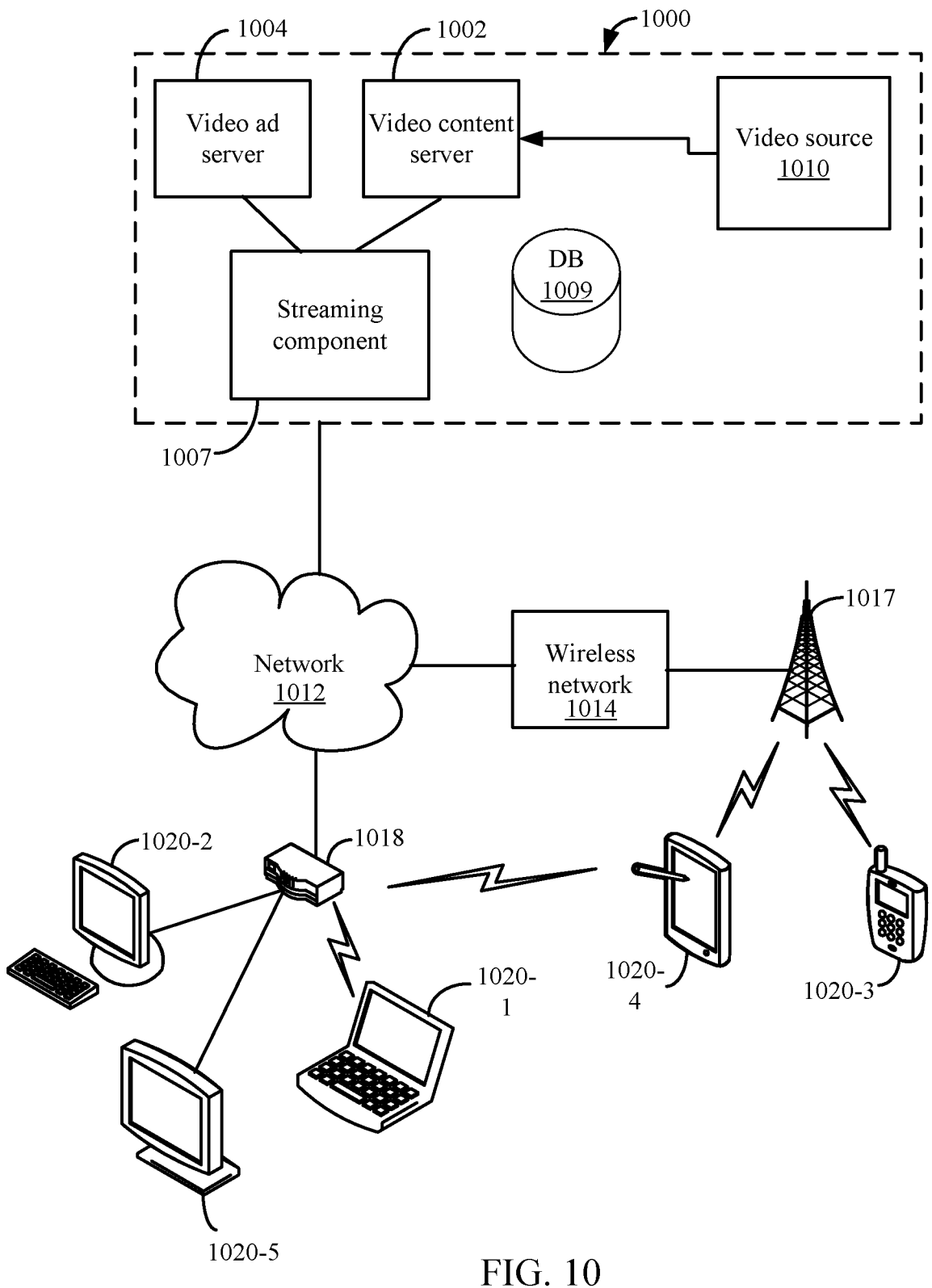
FIG. 10 depicts a video streaming system in communication with multiple client devices via one or more communication networks according to one embodiment.

Features and aspects as disclosed herein may be implemented in conjunction with a video streaming system 1000 in communication with multiple client devices via one or more communication networks as shown in FIG. 10. Aspects of the video streaming system 1000 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1000, video data may be obtained from one or more sources for example, from a video source 1010, for use as input to a video content server 1002. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1000 may include one or more computer servers or modules 1002, 1004, and/or 1007 distributed over one or more computers. Each server 1002, 1004, 1007 may include, or may be operatively coupled to, one or more data stores 1009, for example databases, indexes, files, or other data structures. A video content server 1002 may access a data store (not shown) of various video segments. The video content server 1002 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1004 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1000, a public service message, or some other information. The video advertising server 1004 may serve the video advertising segments as directed by a user interface controller (not shown).

The video streaming system 1000 may further include an integration and streaming component 1007 that integrates video content and video advertising into a streaming video segment. For example, streaming component 1007 may be a content server or streaming media server. A controller (not shown) may determine the selection or configuration of advertising in the streaming video based on any suitable algorithm or process. The video streaming system 1000 may include other modules or units not depicted in FIG. 10, for example, administrative servers, commerce servers, network infrastructure, advertising selection engines, and so forth.

The video streaming system 1000 may connect to a data communication network 1012. A data communication network 1012 may comprise a local area network (LAN), a wide area network (WAN), for example, the Internet, a telephone network, a wireless cellular telecommunications network (WCS) 1014, or some combination of these or similar networks.

One or more client devices 1020 may be in communication with the video streaming system 1000, via the data communication network 1012, wireless cellular telecommunications network 1014, and/or another network. Such client devices may include, for example, one or more laptop computers 1020-1, desktop computers 1020-2, "smart" mobile phones 1020-3, tablet devices 1020-4, network-enabled televisions 1020-5, or combinations thereof, via a router 1018 for a LAN, via a base station 1017 for a wireless cellular telecommunications network 1014, or via some other connection. In operation, such client devices 1020 may send and receive data or instructions to the system 1000, in response to user input received from user input devices or other input. In response, the system 1000 may serve video segments and metadata from the data store 1009 responsive to selection of media programs to the client devices 1020. Client devices 1020 may output the video content from the streaming video segment in a media player using a display screen, projector, or other video output device, and receive user input for interacting with the video content.

Distribution of audio-video data may be implemented from streaming component 1007 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1007 may communicate with client device 1020 using control messages and data messages to adjust to changing network conditions as the video is played. These control messages can include commands for enabling control functions such as fast forward, fast reverse, pausing, or seeking to a particular part of the file at the client.

Since streaming component 1007 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1007 may use TCP-based protocols, such as HTTP and Real Time Messaging Protocol (RTMP). Streaming component 1007 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 11:
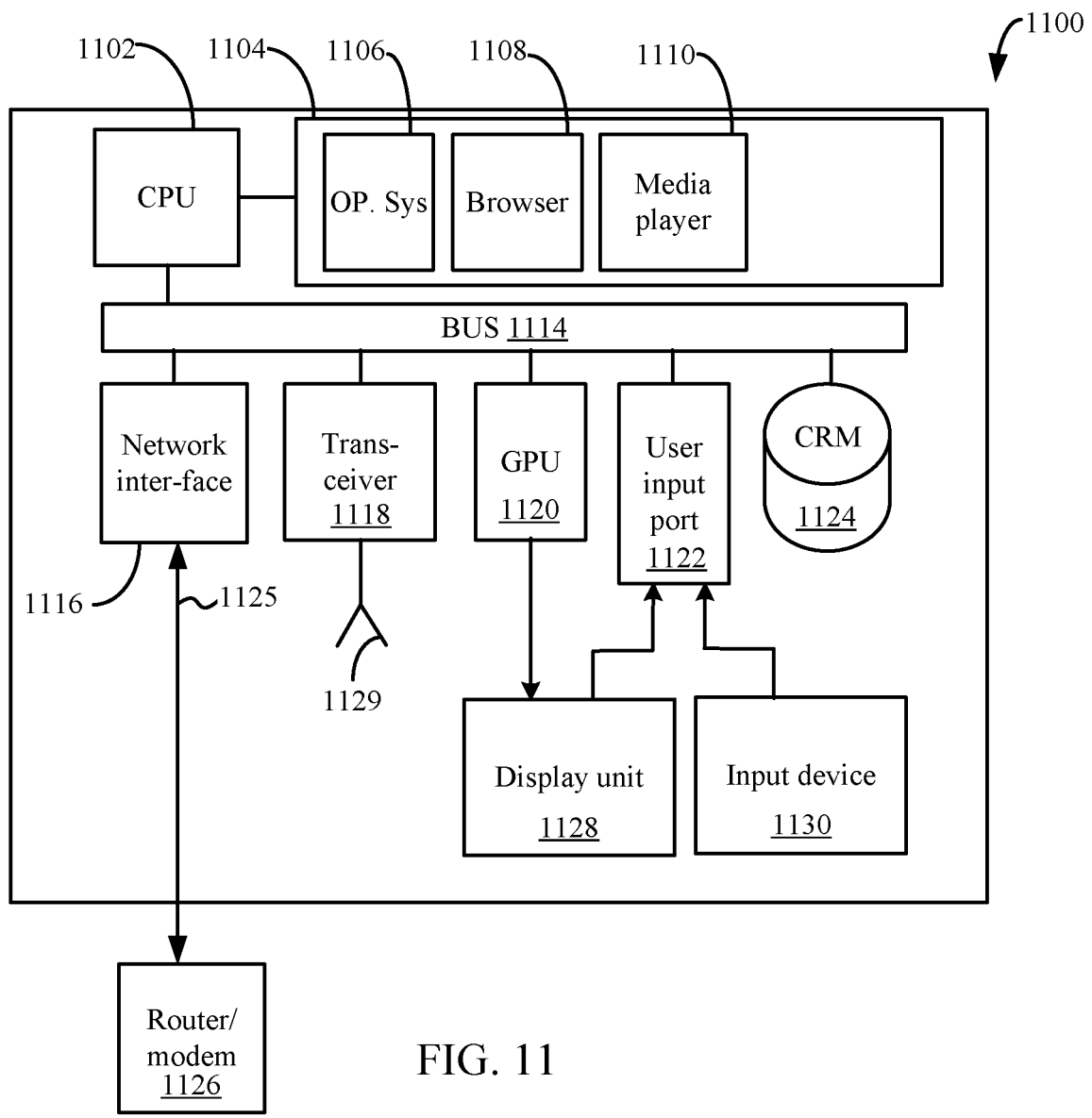
FIG. 11 depicts a diagrammatic view of an apparatus for viewing video content and advertisements.

Referring to FIG. 11, a diagrammatic view of an apparatus 1100 for viewing video content and advertisements is illustrated. In selected embodiments, the apparatus 1100 may include a processor (CPU) 1102 operatively coupled to a processor memory 1104, which holds binary-coded functional modules for execution by the processor 1102. Such functional modules may include an operating system 1106 for handling system functions such as input/output and memory access, a browser 1108 to display web pages, and media player 1110 for playing video. The memory 1104 may hold additional modules not shown in FIG. 11, for example modules for performing other operations described elsewhere herein.

A bus 1114 or other communication component may support communication of information within the apparatus 1100. The processor 1102 may be a specialized or dedicated microprocessor configured or operable to perform particular tasks in accordance with the features and aspects disclosed herein by executing machine-readable software code defining the particular tasks. Processor memory 1104 (e.g., random access memory (RAM) or other dynamic storage device) may be connected to the bus 1114 or directly to the processor 1102, and store information and instructions to be executed by a processor 1102. The memory 1104 may also store temporary variables or other intermediate information during execution of such instructions.

A computer-readable medium in a storage device 1124 may be connected to the bus 1114 and store static information and instructions for the processor 1102; for example, the storage device (CRM) 1124 may store the modules 1106, 1108, 1110 and 1112 when the apparatus 1100 is powered off, from which the modules may be loaded into the processor memory 1104 when the apparatus 1100 is powered up. The storage device 1124 may include a non-transitory computer-readable storage medium holding information, instructions, or some combination thereof, for example instructions that when executed by the processor 1102, cause the apparatus 1100 to be configured or operable to perform one or more operations of a method as described herein.

A communication interface 1116 may also be connected to the bus 1114. The communication interface 1116 may provide or support two-way data communication between the apparatus 1100 and one or more external devices, e.g., the streaming system 1000, optionally via a router/modem 1126 and a wired or wireless connection. In the alternative, or in addition, the apparatus 1100 may include a transceiver 1118 connected to an antenna 1129, through which the apparatus 1100 may communicate wirelessly with a base station for a wireless communication system or with the router/modem 1126. In the alternative, the apparatus 1100 may communicate with a video streaming system 1000 via a local area network, virtual private network, or other network. In another alternative, the apparatus 1100 may be incorporated as a module or component of the system 1000 and communicate with other components via the bus 1114 or by some other modality.

The apparatus 1100 may be connected (e.g., via the bus 1114 and graphics processing unit 1120) to a display unit 1128. A display 1128 may include any suitable configuration for displaying information to an operator of the apparatus 1100. For example, a display 1128 may include or utilize a liquid crystal display (LCD), touchscreen LCD (e.g., capacitive display), light emitting diode (LED) display, projector, or other display device to present information to a user of the apparatus 1100 in a visual display.

One or more input devices 1130 (e.g., an alphanumeric keyboard, microphone, keypad, remote controller, game controller, camera or camera array) may be connected to the bus 1114 via a user input port 1122 to communicate information and commands to the apparatus 1100. In selected embodiments, an input device 1130 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1128, for example using a touch sensitive screen. A cursor control device may communicate direction information and command selections to the processor 1102 and control cursor movement on the display 1128. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving a first set of video files at a node that delivers video files to client devices;
   receiving a second set of video files at the node, wherein the video files in the second set of video files are predicted in a prediction to be delivered by the node to a plurality of user accounts during a time period, wherein probabilities that are at a video file level of which video files may be accessed by each of the plurality of user accounts during the time period are used in the prediction;
   storing a third set of video files that have been requested by one or more clients at the node, wherein the first set of videos are stored in a first portion of storage that is not changed for longer than the time period, the second set of video files is stored in a second portion of the storage that is not changed for the time period, and the third set of video files is stored in a third portion of the storage that is dynamically changed during the time period;
   after receiving the second set of video files at the node, receiving, by the node, a request for a video file from a client device;

determining, by the node, whether the video file is stored in the first set of video files, the second set of video files, or the third set of video files; and when the video file is stored in the first set of video files, the second set of video files, the third set of video files, sending, by the node, the video file from the first set of video files, the second set of video files, or the third set of video files.

2. The method of claim 1, wherein video files in the first set of video files are set on multiple nodes that can deliver the video files to client devices.

3. The method of claim 2, wherein the video files in the first set of video files are manually set on the multiple nodes.

4. The method of claim 1, further comprising:
storing a video file in the third set of video files based on the video file being requested from another node.

5. The method of claim 1, wherein:
a video file in the second set of video files is updated upon expiration of the time period, and
video files in the updated second set of video files are predicted to be delivered by the node to a client device during a next time period.

6. The method of claim 1, wherein video files in the second set of video files are determined by predicting which client devices may access the video files in the second set of video files on the node during the time period.

7. The method of claim 1, wherein:
video files in the first set of video files are the same across a plurality of nodes that can deliver video files to the client devices; and
video files in the second set of video files are determined per node in the plurality of nodes based on predicting which client devices may access video files in a respective second set of video files on a respective node during the time period.

8. The method of claim 1, wherein a video file in the second set of video files has not yet been offered for playback.

9. The method of claim 1, further comprising:
removing a duplicate copy of a video file in one of the first set of video files, the second set of video files, and the third set of video files.

10. The method of claim 9, further comprising:
determining which of the first set of set of video files, the second set of set of video files, and the third set of files to keep one of the duplicate copies of the video file.

11. The method of claim 1, wherein the second set of video files is stored at the node before the time period that is used in the prediction.

12. The method of claim 1, further comprising:
removing the second set of video files based on the time period used in the prediction.

13. The method of claim 1, further comprising:
after the time period, receiving an updated second set of video files including video files that are predicted to be delivered by the node in a new time period.

14. The method of claim 1, wherein the prediction is based on probabilities of which nodes may be used for each of the plurality of user accounts in the time period and probabilities of which video files may be accessed by each of the plurality of user accounts.

15. The method of claim 1, wherein the prediction generates a list of video files for the node based on the probabilities of which video files may be accessed and the probability that the node may be used for each of the plurality of user accounts.

16. The method of claim 1, further comprising:
when the video file is not stored in the first set of video files, the second set of video files, and the third set of files, sending, by the node, a request for the video file to another node.

17. The method of claim 1, wherein video files in the first set of videos are manually set.

18. A non-transitory computer-readable storage medium having stored thereon computer executable instructions, which when executed by a node, cause the node to be operable for:
receiving a first set of video files at a node that delivers video files to client devices;
receiving a second set of video files at the node, wherein the video files in the second set of video files are predicted in a prediction to be delivered by the node to a plurality of user accounts during a time period, wherein probabilities that are at a video file level of which video files may be accessed by each of the plurality of users accounts during the time period are used in the prediction;
storing a third set of video files that have been requested by one or more clients at the node, wherein the first set of videos are stored in a first portion of storage that is not changed for longer than the time period, the second set of video files is stored in a second portion of the storage that is not changed for the time period, and the third set of video files is stored in a third portion of the storage that is dynamically changed during the time period;
after receiving the second set of video files at the node, receiving, by the node, a request for a video file from a client device;
determining, by the node, whether the video file is stored in the first set of video files, the second set of video files, or the third set of video files; and
when the video file is stored in the first set of video files, the second set of video files, or the third set of video files, sending, by the node, the video file from the first set of video files, the second set of video files, or the third set of video files.

19. The non-transitory computer-readable storage medium of claim 18, operable for:
when the video file is not stored in the first set of video files, the second set of video files, and the third set of files, sending, by the node, a request for the video file to another node.

20. A node comprising:
one or more computer processors; and
a non-transitory computer-readable storage medium comprising instructions, that when executed, control the one or more computer processors to be operable for:
receiving a first set of video files at a node that delivers video files to client devices;
receiving a second set of video files at the node, wherein the video files in the second set of video files are predicted in a prediction to be delivered by the node to a plurality of user accounts during a time period, wherein probabilities that are at a video file level of which video files may be accessed by each of the plurality of user accounts during the time period are used in the prediction;
storing a third set of video files that have been requested by one or more clients at the node, wherein the first set of videos are stored in a first portion of storage that is not changed for longer than the time period, the second set of video files is stored in a second portion of the storage that is not changed for the time period, and the third set of video files is stored in a third portion of the storage that is dynamically changed during the time period;

after receiving the second set of video files at the node, receiving, by the node, a request for a video file from a client device;

determining, by the node, whether the video file is stored in the first set of video files, the second set of video files, or the third set of video files; and when the video file is stored in the first set of video files, the second set of video files, or the third set of video files, sending, by the node, the video file from the first set of video files, the second set of video files, or the third set of video files.

* * * * *

UNITED STATES PATENT AND TRADEMARK OFFICE
CERTIFICATE OF CORRECTION

PATENT NO. : 11,496,809 B2
APPLICATION NO. : 16/932512
DATED : November 8, 2022
INVENTOR(S) : Xiaocheng Li et al.

It is certified that error appears in the above-identified patent and that said Letters Patent is hereby corrected as shown below:

In the Claims

Claim 1, Column 19, Line 5, change "files, the third" to -- files, or the third --

Claim 7, Column 19, Line 31, change "devices;" to -- devices, --

Signed and Sealed this
Twenty-seventh Day of December, 2022

Katherine Kelly Vidal
*Director of the United States Patent and Trademark Office*